UNITED STATES PATENT OFFICE.

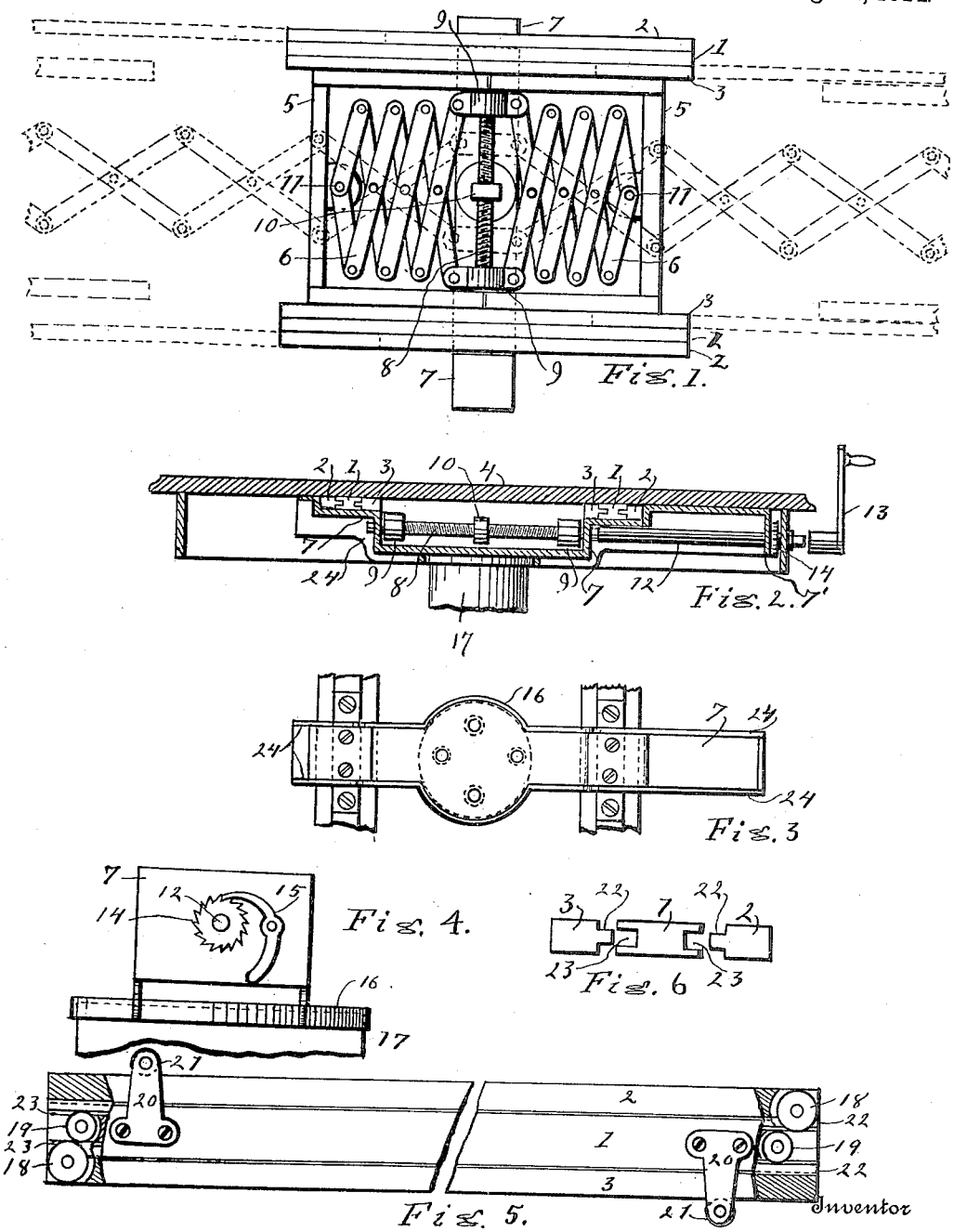

JAMES INGELLS, OF MUSKEGON, MICHIGAN.

EXTENSION-TABLE.

1,106,872.

Specification of Letters Patent.

Patented Aug. 11, 1914.

Application filed November 17, 1913. Serial No. 801,505.

*To all whom it may concern:*

Be it known that I, JAMES INGELLS, a citizen of the United States, residing at Muskegon, in the county of Muskegon and State of Michigan, have invented certain new and useful Improvements in Extension-Tables, of which the following is a specification.

My invention relates to improvements in the extension mechanism for extension tables of all classes, and its objects are: First, to provide a yoke connected with the table frame for carrying the slides and the actuating screws whereby the table may be extended or shortened by simply turning a crank at one side of the table. Second, to provide a means whereby the table extensions may be firmly locked when the table has been adjusted to the desired length, and, third, to provide a means whereby the extension slides may be made to work with absolute freedom, and still avert the danger of their becoming disconnected when extending or withdrawing the table.

I attain these objects by the mechanism and construction shown in the accompanying drawings, in which—

Figure 1 is a top plan of the extension mechanism separated from the table. Fig. 2 is a transverse section of the table top and a longitudinal section of the yoke in which the actuating mechanism is supported. Fig. 3 is a bottom plan of the yoke. Fig. 4 is an end view of the yoke showing a ratchet wheel and pawl for locking the table in desired positions. Fig. 5 is a plan of the slides showing the manner of securing them together and insuring free longitudinal movement of the outer and inner slide upon the center slide, and Fig. 6 is an end view of the slides.

Similar letters refer to similar parts throughout the several views.

In the accompanying drawings 1, 2 and 3 represent ordinary table runs or slides adapted for extending or contracting an extension table, the center slide, or 1 being securely attached to the yoke 7 and the outside slide 2 and inside slide 3 arranged to slide in opposite directions as the table is being extended or contracted.

Ordinarily extension tables are extended or withdrawn by taking hold of the ends or sides of the table and drawing or forcing them in the desired directions by hand, which usually requires the service of two persons. To overcome this inconvenience I form a metal supporting yoke 7 in which I mount a screw 8 that is made with a right handed thread from the center to one end, and a left handed thread from the center to the other end, as indicated in Fig. 2, and mount on this screw a right handed and a left handed nut 9 9 so that if the screw is made to revolve to the right these nuts will be made to approach the center of the screw, and if turned in the opposite direction the nuts will be carried toward the ends of the screw. The nuts are provided with a short wing at each end to which the links of a cross link extension appliance 6, or so called "lazy tong construction", are pivoted, as indicated in Fig. 1, and the several links of said construction, pivoted together at the centers and ends, and finally pivoted to the center of any available form of frame, as 5, forms a construction that will cause said frames, and with them, the table top to be forced outward, or extended when the actuating screw is made to revolve in one direction, and to withdraw or come together when said screw is made to revolve in the other direction, by reason of the nuts 9 9 moving toward, or from each other on the screw, and causing the connected ends of the cross link construction to approach, or recede from each other, thus forcing the full construction to extend longitudinally of the table, as indicated by the dotted outlines of said construction in Fig. 1, or to withdraw to the position indicated by the solid lines in Fig. 1. The yoke 7 is constructed with three bearings for supporting the screw 8 and the shaft 12, and with two bearings for carrying the slides 1, 2 and 3, as indicated in Fig. 2 of the drawing, and is permanently supported on the center leg 17 of the table, so it will hold the top of the table firmly in place whether the table is extended or closed up, and will hold the screw and shaft so firmly as to render every movement of the table top absolutely positive.

For actuating the screw 8 as desired I extend a shaft 12 from the screw to the edge or side of the table and provide a crank, as 13, for revolving said shaft and screw as desired. At the outer end of this shaft, between the end 7' of the yoke 7 and the table rail, I place a ratchet wheel 14, which is designed to coöperate with the pawl 15 so that after a table has been extended to the desired length it may be drawn together so that the parts will unite and then the table may be locked to place with the pawl and ratchet so that there will be no possibility of its working, or being drawn apart with danger of upsetting or breaking dishes.

To facilitate the movements of the slides, 1, 2, 3, for extending or withdrawing the table I form a tongue on the inner edge of the outside, and the inside slide, as shown at 22, and a corresponding groove in both edges of the center slide, as at 23, which are adapted to slide freely, the one in the other. I further provide for facilitating the movement of these slides, and for reducing the friction to the minimum by placing a roller at each end of the center slide, as at 19, one of said rollers extending a very short distance into the groove on one side of the slide, and the other roller projecting into the groove on the other side of the slide so that the tongues 22 cannot come in contact with the wall of the slide at the bottom of the grooves, and at the opposite ends of the outside slides I place a roller 18 that is designed to travel upon the wall at the bottom of said grooves, so that as the slide 2 is made to travel to the left and the slide 3 is made to travel to the right, simultaneously, the rollers 18 traveling on the walls at the backs of the grooves and the rollers 19 traveling on the edges of the tongues 22 will allow the slides to be operated longitudinally with practically no friction.

The arms 20, securely attached to the central slide, or run, are designed to carry small rollers 21 in position to travel upon the outer edges of the outer slides for the purpose of holding the slides to place and averting the possibility of the tongues drawing out of the grooves and rendering the slides inoperative or endangering the possibility of disconnecting them when the table is being extended or closed.

24 represents a flange or web that projects downward from each edge of the yoke for strengthening it, and 16 represents a form where the flange expands and extends downward to receive the top of the center leg 17 of the table, to which the yoke is secured by any available means, as screws, as indicated by the openings in Fig. 3, or otherwise.

10 represents a central collar on the screw designed to act as a divisional collar between the right handed, and the left handed thread on the screw.

11 indicates the bearing where the extension appliance 6 is connected, pivotally, with the frame 5, and this frame, or its equivalent, is secured to the table top 4 at each end of the table so that when the frame is made to move longitudinally of the table by the action of the screw 8 and the extension links 6 the table tops will be carried with them.

What I claim as new, and desire to secure by Letters Patent of the United States, is:—

1. In combination with the frame, pedestal, centrally divided top, and slides of an extension table; a metal yoke arranged to be secured firmly on the pedestal, a bottom and a side bearing at each end of the yoke for the support and free movement of the slides, offsets below the slide supporting surfaces forming bearings for an actuating screw, its actuating rod, and nuts, an actuating screw and rod mounted in said yoke, said screw having a right handed thread and a left handed thread thereon, corresponding nuts mounted on the screw, cross link extension mechanism properly connected with said nuts at the center and with the respective ends of the table at the ends so that the turning of the screw will cause the ends of the table to be forced from, or drawn toward each other, two sets of slides mounted on the yoke with the central slide of each set securely attached to the yoke and the outside slides attached to the respective ends of the table.

2. In combination with the pedestal, frame, centrally divided top, and slides of an extension table; a yoke supported on the pedestal and having bearings for the top of the table when closed, and offsets and bearings for the sides and bottoms of the slides, other offsets forming bearings and supports for an actuating screw and rod, a screw having right handed threads and left handed threads, mounted in said yoke, corresponding nuts mounted on said screw, cross link extension mechanism located each side of the screw and connected at the adjacent ends with the nuts, the opposite ends connected with the respective ends of the table so that the turning of the screw will cause the ends of the table to be forced apart or drawn together, a set of slides mounted in the bearings on the yoke with the central slide centrally secured to the yoke at each end thereof, and the side slides secured at one end to the corresponding end of the table, an actuating rod mounted in the yoke and connected with the screw for turning the screw, a ratchet connected with the actuating rod, and a pawl pivotally connected with the yoke for locking the table in desired positions when properly adjusted.

Signed at Muskegon Michigan November 10th 1913.

JAMES INGELLS.

In presence of—
ALFRED DAVIDSON,
THOS. CARLSON.